United States Patent
Kim et al.

(10) Patent No.: US 9,265,063 B2
(45) Date of Patent: Feb. 16, 2016

(54) METHOD TO TRANSMIT DOWNLINK SIGNALING MESSAGE ON CELLULAR SYSTEMS FOR PACKET TRANSMISSION AND METHOD FOR RECEIVING THE MESSAGE

(75) Inventors: Jae-Heung Kim, Daejon (KR); Kyoung-Seok Lee, Daejon (KR); Jung-Im Kim, Daejon (KR); Soo-Jung Jung, Daejon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1033 days.

(21) Appl. No.: 12/305,891

(22) PCT Filed: Jun. 21, 2007

(86) PCT No.: PCT/KR2007/003016
§ 371 (c)(1),
(2), (4) Date: Dec. 19, 2008

(87) PCT Pub. No.: WO2007/148930
PCT Pub. Date: Dec. 27, 2007

(65) Prior Publication Data
US 2010/0246499 A1    Sep. 30, 2010

(30) Foreign Application Priority Data

Jun. 21, 2006 (KR) .......................... 10-2006-0056004
Aug. 16, 2006 (KR) .......................... 10-2006-0077262

(51) Int. Cl.
*H04W 72/12* (2009.01)
*H04W 28/06* (2009.01)

(52) U.S. Cl.
CPC .......... *H04W 72/1289* (2013.01); *H04W 28/06* (2013.01); *H04W 72/121* (2013.01)

(58) Field of Classification Search
CPC ...................... H04W 72/1289; H04W 74/0833
USPC ......................................................... 370/329
See application file for complete search history.

(56) References Cited

U.S. PATENT DOCUMENTS 5,918,170 A * 6/1999 Oksanen et al. ............ 455/343.4
2001/0053697 A1 * 12/2001 Nakada ......................... 455/456
(Continued)

FOREIGN PATENT DOCUMENTS

EP      1418786 A1    5/2004
EP      1549088 A2    6/2005
(Continued)

OTHER PUBLICATIONS

U.S. Appl. No. 60/757,063, filed Jan. 5, 2006.*
(Continued)

*Primary Examiner* — Brandon Renner
*Assistant Examiner* — Scott M Sciacca
(74) *Attorney, Agent, or Firm* — Staas & Halsey LLP

(57) ABSTRACT

Provided is a downlink control information transmitting and receiving method which can maximize the use of limited radio resources by effectively forming an uplink signaling message to be transmitted from a base station to a terminal and transmitting the formed uplink signaling message with a minimum amount of radio resources occupied. The method for transmitting downlink data generation indication information for a base station to inform a terminal of packet data transmission in a packet-based cellular system, includes the steps of: a) generating the downlink data generation indication information; b) recording radio resource allocation information in downlink scheduling information for transmitting the downlink data generation indication information, and allocating information for the downlink data generation indication information to downlink-shared radio resources; and c) transmitting the downlink scheduling information and the information for the downlink data generation indication information according to a transmission cycle.

4 Claims, 4 Drawing Sheets

(56) References Cited

U.S. PATENT DOCUMENTS

| | | | |
|---|---|---|---|
| 2003/0125069 A1 | 7/2003 | Lee | |
| 2005/0101351 A1* | 5/2005 | Lee et al. | 455/558 |
| 2005/0176474 A1* | 8/2005 | Lee et al. | 455/574 |
| 2005/0271007 A1* | 12/2005 | Hwang et al. | 370/329 |
| 2007/0047493 A1* | 3/2007 | Park et al. | 370/331 |
| 2007/0135080 A1* | 6/2007 | Islam et al. | 455/343.1 |
| 2007/0140178 A1 | 6/2007 | Jung et al. | |
| 2008/0200177 A1* | 8/2008 | Wang et al. | 455/450 |
| 2009/0011718 A1* | 1/2009 | Chun et al. | 455/70 |
| 2009/0011769 A1* | 1/2009 | Park et al. | 455/450 |

FOREIGN PATENT DOCUMENTS

| | | | |
|---|---|---|---|
| KR | 2001-0028139 | 4/2001 | |
| KR | 2001-0033650 | 4/2001 | |
| KR | 2003-0056941 | 7/2003 | |
| KR | 10-2005-0057926 | 6/2005 | |
| WO | WO 2005057822 A1 * | 6/2005 | H04J 13/02 |

OTHER PUBLICATIONS

U.S. Appl. No. 60/771,305, filed Feb. 7, 2006.*
U.S. Appl. No. 60/771,791, filed Feb. 8, 2006.*
3GPP TSG-RAN WG2 #52 R2-061002, LG Electronics Inc., "UE state transition in LTE_ACTIVE", Mar. 2006, pp. 1-4.*
International Application No. PCT/KR2007/003016; International Search Report Mailing Date: Sep. 21, 2007.
3rd Generation Partnership Project; Technical Specification Group Radio Access Network; Radio Resource Control (RRC); Protocol Specification (Release 5); 3GPP TS 25.331 V5.4.0 (Mar. 2003) (983 pp).

* cited by examiner

METHOD TO TRANSMIT DOWNLINK SIGNALING MESSAGE ON CELLULAR SYSTEMS FOR PACKET TRANSMISSION AND METHOD FOR RECEIVING THE MESSAGE

CROSS REFERENCE TO RELATED PATENT APPLICATIONS

This application claims the benefit under 35 U.S.C. Section 371, of International Application No. PCT/KR2007/003016, filed Jun. 21, 2007, which claimed priority to Korean Application No. 10-2006-0056004, filed Jun. 21, 2006, and Korean Application No. 10-2006-0077262, filed Aug. 16, 2006, in the Korean Intellectual Property Office, the disclosures of all of which are hereby incorporated by reference.

TECHNICAL FIELD

The present invention relates to a method for transmitting and receiving downlink signaling message in a packet-based cellular system; and, more particularly, to a downlink control information transmitting and receiving method which can maximize the use of limited radio resources by effectively forming an uplink signaling message to be transmitted from a base station to a terminal and transmitting the formed uplink signaling message with a minimum amount of radio resources occupied.

BACKGROUND ART

A conventional Wideband Code Division Multiple Access (WCDMA) is a circuit based system that transmits control information such as a signaling message from a base station to a terminal using a downlink dedicated channel. A long term evolution (LTE) system was introduced as a packet-based system and has been standardized for providing various packet services, and there have been many researches in progress for finding a method for effectively and variably using radio resources for the LTE system.

The long term evolution (LTE) system is a technology that realizes a high-speed packet-based communication, for example, about 100 Mbps. It is expected that the LTE system will be commercialized by around 2010. An Orthogonal Frequency Division Multiplexing Access (OFDMA) has been considered to be used for the LTE system. Unlike a Code Division Multiple Access (CDMA) that distinguishes radio resources of each terminal by allocating codes, the OFDMA system has two dimensional radio resources distinguished by a frequency and a time. That is, the OFDMA system transmits and receives radio resources constituted of time and frequency for uplink physical channel and downlink physical channel. Also, the OFDMA system uses radio resource blocks divided by a transmission time interval (TTI) as a transmission period and a subcarrier group. A radio frame constituting such radio resources is formed of 0.5 millisecond slots or TTIs. Therefore, one radio frame is formed of 20 slots in case of a 10-millisecond radio frame.

Unlike a circuit system that dedicatedly allocates radio resources to terminals, the packet-based LTE system allows terminals to share radio resources to transmit a packet service data. The LTE system allocates radio resources according to a radio channel condition of a terminal, which dynamically changes according to whether the necessity of data transmission and according to a time. Therefore, the LTE system needs a method for providing uplink control information to various terminals through a radio resource in order to enable each of terminals to discriminate radio resources allocated to itself from radio resources allocated to the others, access, and modulate the allocated radio resource according to a cycle of allocating a radio resource. Also, the LTE system needs a method for forming an uplink control information to variably and flexibly use physical layer radio resource and a method for transmitting the uplink control information.

In order to satisfy such a demand, there was a discussion in progress to classify radio resources into a local allocated radio resource and a distributed allocated radio resource for adaptively allocating and using radio resources corresponding to a wireless environment. In order to effectively allocate these two radio resources, it has been considered to transmit the control information such as a signaling message using a control channel that is shared with a plurality of terminals instead of using a dedicated control channel like the conventional WCDMA and to transmit some of control information using radio resources allocated to each of terminals.

That is, there is a demand for developing a method for effectively forming uplink control information such as an uplink signaling message using a downlink from a base station to a terminal and transmitting the uplink control information with minimum radio resource occupied, thereby improving the usability of limited radio resources.

DISCLOSURE

Technical Problem

An embodiment of the present invention is directed to providing a method for transmitting and receiving downlink control information in a packet-based cellular system, which can maximize the use of limited radio resource by effectively forming a uplink signaling message to transmit from a base station to a terminal and transmitting the formed uplink signaling message with minimum radio resource occupied.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for transmitting downlink data generation indication information for a base station to inform a terminal of packet data transmission in a packet-based cellular system, the method including the steps of: a) generating the downlink data generation indication information; b) recording radio resource allocation information in downlink scheduling information for transmitting the downlink data generation indication information, and allocating information for the downlink data generation indication information to downlink-shared radio resources; and c) transmitting the downlink scheduling information and the information for the downlink data generation indication information according to a transmission cycle.

In accordance with another aspect of the present invention, there is provided a method for receiving control information transmitted from a base station of a packet-based cellular system, the method including the steps of: a) confirming radio resource allocation information in downlink scheduling information; b) confirming a radio resource block location allocated from the radio resource allocation information when the radio resource allocation information includes an own identifier; and c) obtaining the control information transmitted with corresponding radio resources using the confirmed radio resource block location information.

Advantageous Effects

A method for transmitting and receiving downlink control information in a packet-based cellular system according to an embodiment present invention can maximize the utility efficiency of limited radio resources by effectively forming an uplink signaling message to be transmitted from a base station to a terminal and transmitting the formed uplink signaling message with a minimum amount of radio resources occupied.

BEST MODE FOR THE INVENTION

Figure 1:
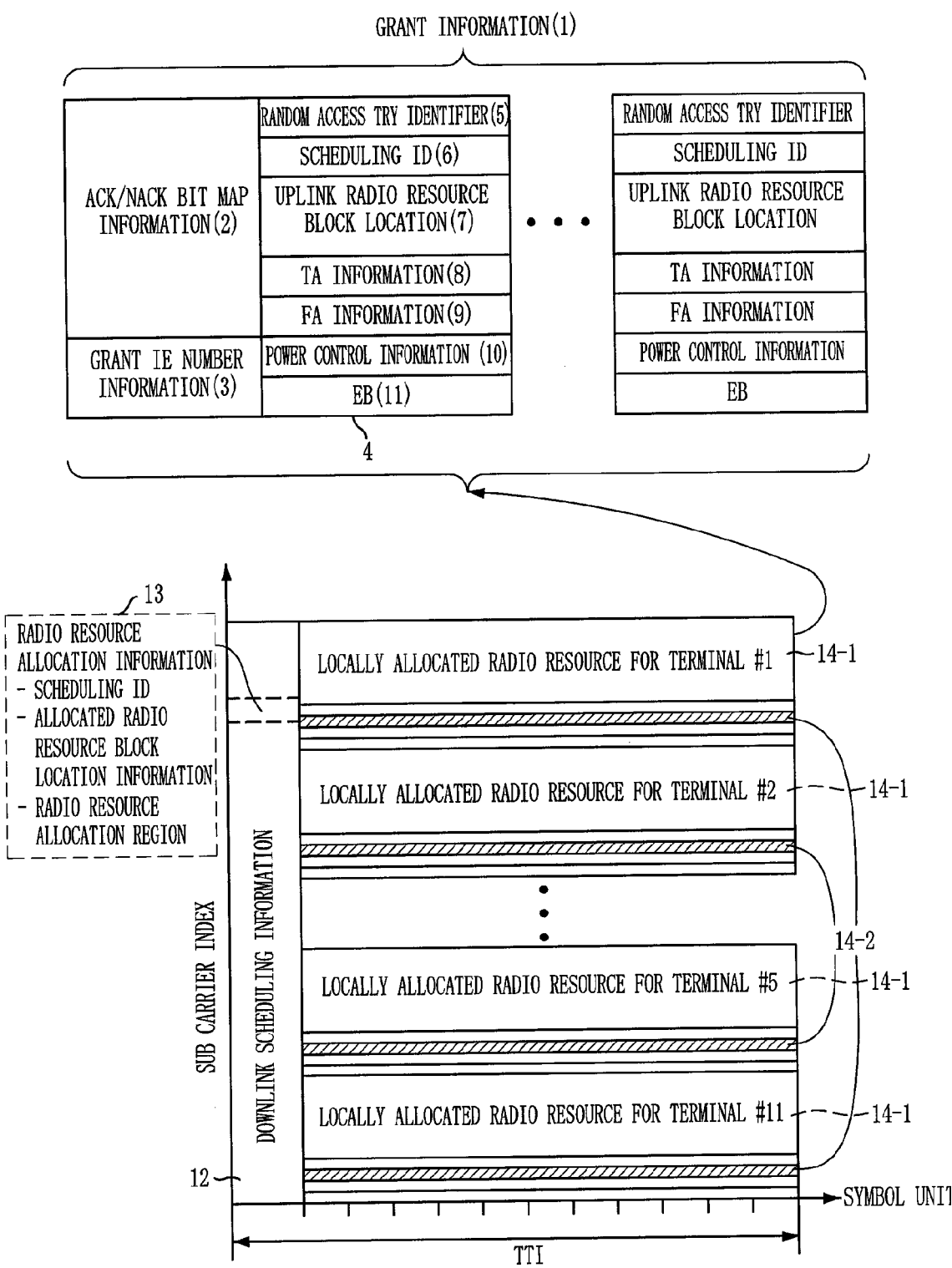
FIG. 1 illustrates transmission of grant information for responding to random access in accordance with an embodiment of the present invention.

The advantages, features and aspects of the invention will become apparent from the following description of the embodiments with reference to the accompanying drawings, which is set forth hereinafter.

At first, a base station generates control information such as a signaling message to be transmitted to terminals. The control information, transmitted from a base station to terminals, includes scheduling control information allocated to each of terminals by a base station for one TTI or for predetermined TTIs, response information for uplink random access, and downlink data generation indication information for terminals that operate in a low power consumption mode.

The control information such as the signaling message, transmitted from a base station to each of terminals for uplink scheduling, may include radio resource allocation information, modulation and coding information, and retransmission information.

The radio resource allocation information may include information about a scheduling identifier, a radio resource block location, and a radio resource allocation duration. The scheduling identifier is information about a terminal or a terminal group where the allocated radio resources belong. The radio resource block location is information to address radio resources of an Orthogonal Frequency Division Multiple Access (OFDMA) where radio resources are divided in a frequency domain and a time domain. The radio resource allocation duration is information about a valid duration of the allocated radio resources.

The modulation and coding information may include transport format information and a multi input multi output (MIMO) related information. The transport format information includes a modulation scheme applied to allocated radio resources, such as QPSK, 16QAM, or 64QAM, and a payload side or a coding level. That is, the transport format information is information to calculate an encoding level by providing the payload size to be transported through the allocated radio resources or to directly provide the encoding level. The MIMO related information is control information necessary to improve the performance of a system by transmitting and receiving using the multiple antennas.

The retransmission information is information related to retransmit packet data which is transmitted using allocated radio resources.

The response information for random access, which is transmitted from a base station to terminals that tried random access, may include radio resource allocation information, scheduling identifier information, positive acknowledgement (ACK) and negative acknowledgement (NACK) bit map information, timing adjustment (TA) information, and power level information. The response information may further include frequency adjustment (FA) information.

The radio resource allocation information includes information about a terminal identifier and a radio resource block location. The terminal identifier is information about a terminal or a terminal group that includes uplink radio resource allocated for random access response. A signature index used for random access or an RA-preamble identifier can be used as the terminal identifier. The radio resource block location is information for addressing uplink radio resource available to terminals that try random access.

The scheduling identifier is an identifier allocated to a terminal by a base station or a scheduler for the base station or the scheduler to identifier terminals. For example, a schedule ID or a MAC ID can be used as the scheduler identifier. The scheduler uses a scheduling identifier when control information such as scheduling information to allocate radio resources is transmitted. Therefore, a scheduler allocates a scheduling identifier when response information is transmitted to a terminal trying random access.

The ACK/NACK bit map information is information about whether a base station receives the preamble signatures of terminals. The ACK/NACK bit map information is formed as a bit map according to the index of the preamble signature that forms an uplink random access burst. The ACK/NACK bit map information includes corresponding bit map information set as '1' when a base station detects a preamble signature transmitted by a terminal or includes corresponding bit map information set as '0' when a base station cannot detect the preamble signature transmitted by a terminal.

The timing adjustment information is timing information to reduce a timing error estimated by a base station using a random signal sequence pattern, i.e. the pattern of preamble or signature for initial random access, for a terminal to sustain uplink synchronization and to adjust for securing uplink physical layer synchronization, where the signal sequence pattern may be a signature or a predetermined symbol pattern, which are transmitted when initial random access is tried.

The power level information is information about a power reference level to set a power level used when a terminal transmits to an uplink using a power level estimated by a base station using a random signal sequence pattern, for example, a signature or a predetermined symbol pattern which is transmitted for initial random access, for a terminal to sustain the uplink synchronization.

The frequency adjustment information is frequency information to reduce a frequency error estimated by a base station using a random signal sequence pattern, for example, a signature and a predetermined symbol pattern transmitted when initial random access, for a terminal to sustain uplink synchronization and to adjust for a terminal to secure uplink physical layer synchronization.

It is essential for a terminal to have a low power consumption function in a packet-based cellular system. For this, terminals perform a low power consuming operation using discontinuous reception cycle (DRX)/discontinuous transmission cycle (DTX) set by a base station according to the burst characteristics of packet data, such as the activity of a terminal (UE activity), after a radio bearer is set with a base station. When a base station generates information to transmit to corresponding terminals, downlink data generation indication information is required to inform the corresponding terminals of the generation of the information.

The downlink data generation indication information includes radio resource allocation information and modulation and coding information. The radio resource allocation information includes a scheduling identifier and radio resource location information. The scheduling identifier is information for a scheduler in a base station to identify a terminal by allocating the scheduling identifier to the terminal or a terminal group for low power consuming operation when a low power consuming operation begins.

The modulation and coding information includes transport format information. The transport format information includes a modulation scheme applied to allocated radio resources, such as QPSK, 16QAM, or 64QAM, and a payload side or a coding level. That is, the transport format information is information to calculate a coding level by providing the payload size to be transported through the allocated radio resources or to directly provide the encoding level.

A base station transmits such control information including scheduling control information, response information for random access, or downlink data generation indication information to a terminal by allocating the control information to a downlink-shared radio resource for packet data transmission.

In an OFDMA scheme which is considered to be used in a packet-based mobile communication system such as a LTE system, terminals share two dimensional radio resources which are distinguished by frequency and time. That is, downlink and uplink physical channels transmit radio resources formed of time and frequency, and a radio resource uses a radio resource block divided by a transmission cycle TTI and a subcarrier group which is a subcarrier index.

As a method for allocating control information to downlink-shared radio resource block, a radio resource is variable allocated using downlink scheduling information, and a part of radio resources is exclusively allocated and used.

A method for variably allocating control information to a radio resource using downlink scheduling information, and a method for exclusively allocating control information to a radio resource will be described with reference to accompanying drawings.

A terminal confirms the relations between radio resources and terminal scheduling identifiers by searching uplink scheduling information transmitted on downlink at every transmission time interval (TTI). Then, the terminal checks a corresponding radio resource location and a radio resource allocation region when its own scheduling identifier or a scheduling identifier of an own group is included in the uplink scheduling information. After checking, the terminal encodes and modulates packet data with a radio resource allocated to oneself using modulation and coding information. Meanwhile, the terminal checks the relation between radio resources and terminal scheduling identifiers by searching downlink scheduling information transmitted to a downlink at every TTI. Then, the terminal confirms a corresponding radio resource location and a radio resource allocation region when a scheduling identifier or a scheduling identifier of its group is included in the downlink scheduling information. After confirming, the terminal decodes and demodulates packet data with a radio resource allocated oneself using demodulation and decode information. Also, the terminal performs a hybrid automatic repeat request (HARQ) operation using the retransmission information of uplink control information.

The control information is encoded before it is transmitted on downlink in order to sustain the quality thereof at a predetermined constant level on wireless channel. The control information for terminals may be jointly coded or separately coded. In order to secure the efficiency of a system, the control information must be transmitted by occupying a minimum amount of radio resources. Also, the predetermined level of the quality must be secured in a wireless region with the minimum amount of radio resources, and the performance of the system should be improved.

The scheduling information for downlink and uplink radio resources, which is transmitted at every TTI, must always occupy a predetermined part of a resource forming a TTI, and the amount of radio resources allocated for control information must be satisfied by signaling overhead that is required by a system. That is, although a predetermined part of radio resources forming a TTI is allocated as a radio resource to transmit control information such as scheduling, the amount of radio resources allocated for packet data should be satisfied by the signaling overhead required by a system. For example, radio resources for transmitting control information in a TTI occupy about 10% to 20% of the entire radio resources in a TTI.

Therefore, all of the control information cannot be transmitted using radio resources for transmitting control information. Accordingly, a scheduler may use radio resources for control information to transmit scheduling information which is radio allocation information for downlink and uplink that must be transmitted at every TTI. The scheduler may use radio resources allocated for packet data to transmit control information required for event generation (event-driven signaling).

Downlink response(grant) information and downlink data generation indication information can be transmitted by variably allocating radio resources for packet data transmission using downlink scheduling information. Otherwise, they are transmitted by exclusively allocating a predetermined part of radio resources. The downlink response information may be downlink grant information for response to an uplink for random access, and the downlink data generation indication information is for informing terminals of the generation of information to transmit from a base station to corresponding terminals in low consumption operation mode.

When such information is transmitted by exclusively allocating a predetermined part of radio resources, the exclusively allocated downlink radio resources for transmitting the grant information are radio resources that are searched only by terminals that try random access. Therefore, the radio resources can be used to transmit packet data for the other terminals or to transmit another control information when there is not terminal trying random access. Also, the exclusively allocated downlink radio resource for transmitting the downlink data generation indication information is a radio resource that should be searched by a terminal in a low power consumption mode for confirming whether downlink data is generated or not while a downlink is monitored according to a DRX/DTX cycle.

That is, the method for using downlink scheduling information for transmitting response information for random access can be summarized as follows. A part of a scheduling identifier used for scheduling is reserved and allocated as a group scheduling identifier, and the transmission of response information for random access is addressed using the group scheduling identifier. Therefore, the terminals can check a group scheduling identifier and allocated radio resources for informing the transmission of the grant information for random access by searching downlink scheduling information. After the terminals confirm the group scheduling identifier, each of the terminals obtains data transmitted with a shared radio resource of an allocated radio resource location based on the corresponding group scheduling information, demodulates and decodes the obtained data. As a result, each of the terminals can obtain response information for random access, which is transmitted from a base station.

FIG. 1 is a diagram illustrating a procedure of transmitting grant information with radio resources allocated by downlink scheduling information using a group scheduling identifier as an response for random access in accordance with an embodiment of the present invention.

If the grant information is transmitted as the response for random access using radio resources allocated by downlink scheduling information, proper radio resources cal be allocated according to whether the existence of the response for random access or the size thereof. If it is necessary, the control information may be transmitted using the most robust and adaptive modulation and coding method.

In order to transmit response information for random access as shown in FIG. 1, radio resource allocation information 13 is set into a predetermined part of downlink scheduling information 12. The radio resource allocation information includes information about a scheduling identifier, an allocated radio resource block location, and a radio resource allocation duration. The scheduling identifier is set to a group scheduling identifier which is reserved and allocated for an response for random access. The allocated radio resource block location information denotes the location of grant information allocated to a share radio resource. The grant information is variably local-allocated 14-1 or distributed-allocated 14-2 according to the amount of information to be transmitted to a terminal. Herein, the local-allocation 14-1 is a transmission scheme that allocates control information to a predetermined subcarrier index to transmit the control information to a predetermined terminal.

The distributed allocation 14-2 is a transmission scheme that distributes control information to subcarrier indexes at a regular interval to transmit the control information to a predetermined terminal.

Meanwhile, the grant information included in the local-allocated or the distributed-allocated radio resources has information elements (IE) shown in FIG. 1.

Terminals confirm a group scheduling identifier for transmitting control information and shared radio resource block information allocated thereto by searching downlink scheduling information and obtain control information including the grant information or downlink data generation indication information by demodulating and decoding data transmitted by the allocated radio resources.

Terminals check ACK/NACK bit map information 2 and grant IE number information 3 among the obtained grant information, at first. Each of the terminals confirms whether a base station receives an own preamble signature or not by searching the ACK/NACK bit map information which is formed in a bit map according to the index of a preamble signature forming uplink random access burst, located at the foremost of the information. If bit information corresponding to the own preamble signature is set as '1', it means that the base station receives the own signature. On the contrary, if bit information corresponding to the own preamble signature is set as '0', it means that the base station did not receive the preamble signature tried by oneself.

If the bit map information is set to '0', the terminal retries random access without back-off. However, the terminal checks the number of information elements in a grant message by searching the grant IE number information 3 if the bit map information is set to '1'. Since the terminal directly retries random access without back-off if the bit map information is set to '0' as described above, unnecessary control plane delay can be reduced.

Although it was described that a base station puts ACK and NACK in bit map information as a response for random access and transmits it in the present embodiment, a base station may transmit the acknowledgement to a terminal only for NACK in another embodiments.

After the terminal checks the grant IE number information, the terminal searches grant information IE 4. An index of a signature used for random access or an additional identifier such as random identity can be used as a random access try identifier 5 of the grant information IE 4. The terminal checks a scheduling identifier 6 in the IE when the random access try identifier in the grant information IE is identical to a random access try identifier of the own preamble signature transmitted by itself. Then, the terminal transmits own information such as radio resource control (RRC) connection information to an uplink using uplink radio resource block location 7 information allocated to itself. Herein, uplink timing synchronization is controlled using TA information 8 in the grant information IE. If it is necessary, the grant information IE includes FA information 9 and power level information 10 to proper uplink transmission. The terminal can properly set a power level or a frequency using the FA information 9 and the power level information 10 for uplink transmission.

An extension bit (EB) 11 denotes whether another IE is present or not after the grant information IE 4. If another IE is present, the EB 11 is set to '0', and if the grant information IE 4 is the last information element, the EB 11 is set to '1'.

Meanwhile, the EB 11 can be used to denote whether any other information IE is present after each information IE in a grant information block or an uplink scheduling information block if the grant message is formed without the grant IE number information 3 used.

If a terminal cannot detect grant information IE including a random access try identifier that represents an own preamble signature although the ACK/NACK bit map information is set to '1', the terminal determines that grant information is not included by a base station due to following cases although a base station successfully detects a preamble signature. That is, if transmitted random access supplementary information such as a reason of random access or priority information is not normal, if a received preamble signal is excessively high, or if available radio resources are not proper, a base station do not put grant information for corresponding terminals in the grant information. Therefore, a corresponding terminal tries random access using parameters set for a random access procedure after a predetermined time passes according to back-off. If a terminal performs the back-off as described above, a delay may be generated in a control plane. However, consecutive collision of random access can be avoid.

Hereinafter, a procedure for transmitting downlink data generation indication information from a base station to a terminal if there is packet data to transmit the terminal will be described.

In a conventional cellular system, terminals in an idle state perform a low power consuming operation using discontinuous reception cycle (DRX). The terminals in the idle state include no radio bearer that is a connection path for transmitting and receiving data on wireless channel. A procedure for informing the terminals in the idle state about downlink data generation by a base station is performed through a paging procedure. Such a paging procedure is performed by radio resource control in a base station.

However, in a packet-based mobile communication system, terminals, set a radio bearer to a base station according to the burst characteristic of packet data, performs a low power consuming operation using a discontinuous reception cycle (DRX) and a discontinuous transmission cycle (DTX), which are set by a base station. Therefore, a procedure for informing terminals performing a low power consuming operation about the downlink packet generation is divided into a paging procedure, hereinafter RRC paging, for terminals performing a low power consuming operation in an idle state RRC IDLE where a radio bearer is not set, and a downlink data generation informing procedure, hereinafter MAC paging, for terminals performing a low power consuming operation in a RRC connected state RRC_CONNECTED where a radio bearer is set.

The RRC paging may be triggered by RRC using an additional paging indication channel (PICH) of a physical channel. Also, MAC paging can inform terminals about the necessity of receiving a MAC paging message by setting an indicator of a physical channel.

The MAC paging is triggered by a MAC layer, and different DRX/DTX cycles may be applied according to a service provided to a terminal. Also, since both of a RRC paging message and a MAC paging message have similar property which are transmitted for terminals performing a low power consuming operation, they may be managed together.

Figure 2:
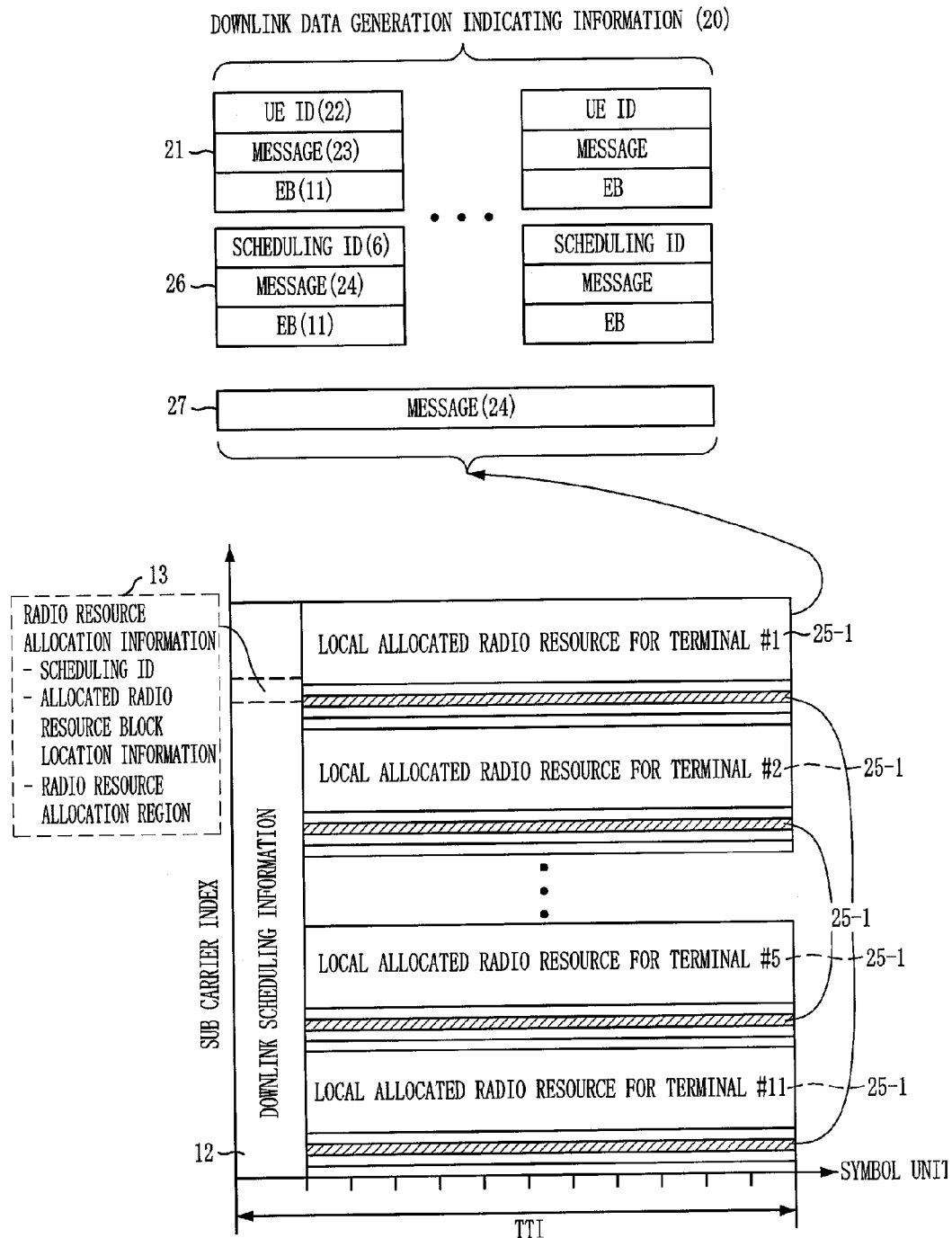
FIG. 2 illustrates transmitting downlink packet generation indication information in accordance with an embodiment of the present invention.

FIG. 2 is a diagram illustrating the transmission of data generation indication information for informing the generation of downlink packet data using radio resources allocated based on uplink scheduling information using a group scheduling identifier in accordance with an embodiment of the present invention.

If downlink data generation indication information is transmitted using radio resources allocated based on downlink scheduling information, radio resources are suitably allocated according to whether information for informing downlink data generation is present or not and according to the size of the information. Also, the most robust adaptive modulation and coding scheme may be used to transmit the downlink data generation indication information if it is necessary.

As shown in FIG. 2, a part of radio resource allocation information 13 in downlink scheduling information 12 is set to transmit downlink data generation indication information. The radio resource allocation information includes information about a scheduling identifier, an allocated radio resource location, and a radio resource allocation duration. Herein, the scheduling identifier is a scheduling identifier uniquely allocated to each of the terminals or a group scheduling identifier that is reserved and allocated for downlink data generation indication information. The allocated radio resource block location information denotes a location of downlink data generation indication information allocated to a shared radio resource. The downlink data generation indication information may be variably local-allocated 25-1 or distributed-allocated 25-2 according to the amount of information transmitted to a terminal.

In case of RRC paging, RRC forms a paging channel (PCH) at a transport channel using paging information if the paging information is generated for a terminal or a group of terminals at a given time. A scheduler in a MAC schedules broadcasting channel information formed in a radio frame unit, the generated paging channel (PCH) information, and traffic information transmitted to a terminal at every TTI.

A base station sets a PICH corresponding to a terminal or a terminal group in consideration of a DRX cycle for the low power consuming operation of terminals in a RRC idle state. If a physical channel for paging (PICH) is not set, operations related to PICH are discarded. It may be replaced to whether a group scheduling identifier is present or not, which indicates scheduling information for a paging message. Then, a base station maps PCH to a radio resource block location of a physical layer allocated in a fixed location and size in a corresponding TTI according to a predetermined value, modulates and codes the radio resources according to a predetermined modulation and coding scheme, and transmits it to a terminal.

If a terminal performing a low power consuming operation according to a DRX cycle detects a PICH in a monitoring duration, the terminal prepares to receive a paging message. Accordingly, if a corresponding terminal checks a group scheduling identifier reserved and allocated for a RRC paging message by searching the radio resource allocation information 13 in the downlink scheduling information 12, the corresponding terminal can confirm a radio resource block where downlink data generation indication information 20 is transmitted. In this case, terminals check a RRC paging message 21 in the downlink data generation indication information.

Since a base station does not store information about a corresponding terminal such as RRC context, the RRC paging message is a message for terminals that are not allocated with an unique terminal identifier such as a scheduling identifier. Therefore, a RRC paging message may includes a terminal identifier 22 such as an international mobile subscriber identity (IMSI) and a temporary mobile subscriber identity (TMSI), a message part 23, and an extension bit (EB) if it necessary.

However, terminals performing a lower power consuming operation with a radio bearer include a scheduling identifier that is allocated to each of the terminal by connecting a base station and a group scheduling identifier that is allocated by a base station according to a group for performing a low power consuming operation in a DRX/DTX cycle. Therefore, a scheduler of a base station can variably transmit downlink data generation indication information according to the number of terminals to transmit the downlink data generation indication information in a monitoring duration of a terminal performing a low power consuming operation at the DRX/DTX cycles and according to the amount of available radio resources at this moment.

A base station allocates radio resources for transmitting the downlink data generation indication information using a group scheduling identifier when the number of terminals to transmit the downlink data generation indication information in a monitoring duration is large and when the available radio resources are insufficient. In this case, terminals confirm the downlink data generation indication information 26 using the radio resource block location information in the radio resource allocation information 13 if the terminal detects a group scheduling identifier allocated to an own low power consuming operation group. The downlink data generation indication information may be formed using a scheduling identifier 6 allocated to each terminal, a message for MAC paging 24, and an extension bit 11.

Meanwhile, a base station can form radio resource allocation information in downlink scheduling information using a scheduling identifier allocated to each of terminals instead of using a group scheduling identifier when the number of terminals to transmit the downlink data generation indication information in a monitoring duration is small and when the available radio resources are sufficient. In this case, terminals confirm downlink data generation indication information 27 using radio resource block location information in radio resource allocation information if an own scheduling identifier is detected by searching the downlink scheduling information in a monitoring duration. In this case, the downlink data generation indication information may be formed as a message 24.

The MAC paging message 24 or the message 24 are a message to be transmitted from a base station to a terminal for MAC paging. The MAC paging message 24 or the message 24 include information for random access if a terminal needs to perform random access as a response for MAC paging, for example, information about a pre-allocated preamble to be used for random access.

Therefore, terminals performing a low power consuming operation determine whether oneself is paged or not by determining whether an own scheduling identifier allocated to oneself without RRC paging and MAC paging distinguished or a group scheduling identifier is included or not when the terminals search radio resource allocation information in downlink scheduling information in a monitoring duration.

Figure 3:
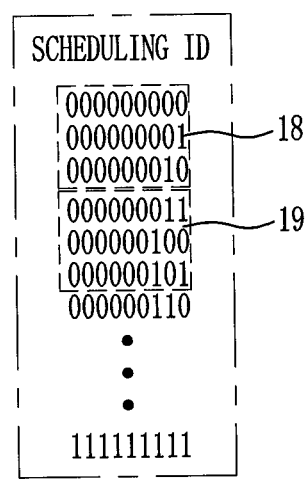
FIG. 3 is a diagram illustrating a group identifier of downlink scheduling information in accordance with an embodiment of the present invention.

FIG. 3 is a diagram illustrating reserving and using a group scheduling identifier allocated for transmitting a part of a scheduling identifier, grant information, and downlink data generation indication information for scheduling radio resources in accordance with an embodiment of the present invention.

If a scheduling identifier is reserved and used, a scheduler allocates scheduling identifiers to each of terminals except a group scheduling identifier when the terminals access a base station. A group scheduling identifier for transmitting the grant information can be used by reserving and allocating a group scheduling identifier according to a random access burst that is configured by a base station where the random access burst may be a random access resource region expressed in a frequency and a time. Also, a group scheduling identifier for transmitting downlink data generation indication information can be used by reserving and allocating an additional group scheduling identifier to each group for low power consuming operations based on a predetermined criteria. Such a group scheduling identifier can be broadcasted in a base station using a broadcast channel (BCH) as system information. On the contrary, a base station can transmit a group scheduling identifier of a corresponding group to terminals when the base station transmits information such as DRX cycle to terminal.

In FIG. 3, a reference numeral 18 denotes a group scheduling identifier reserved and allocated for transmitting response information for random access, and a reference numeral 19 denotes a group scheduling identifier allocated for transmitting paging message or downlink data generation indication information. As described above, the group scheduling identifier may be broadcasted through a broadcast channel (BCH) with system information or separately transmitted to each of terminals.

Figure 4:
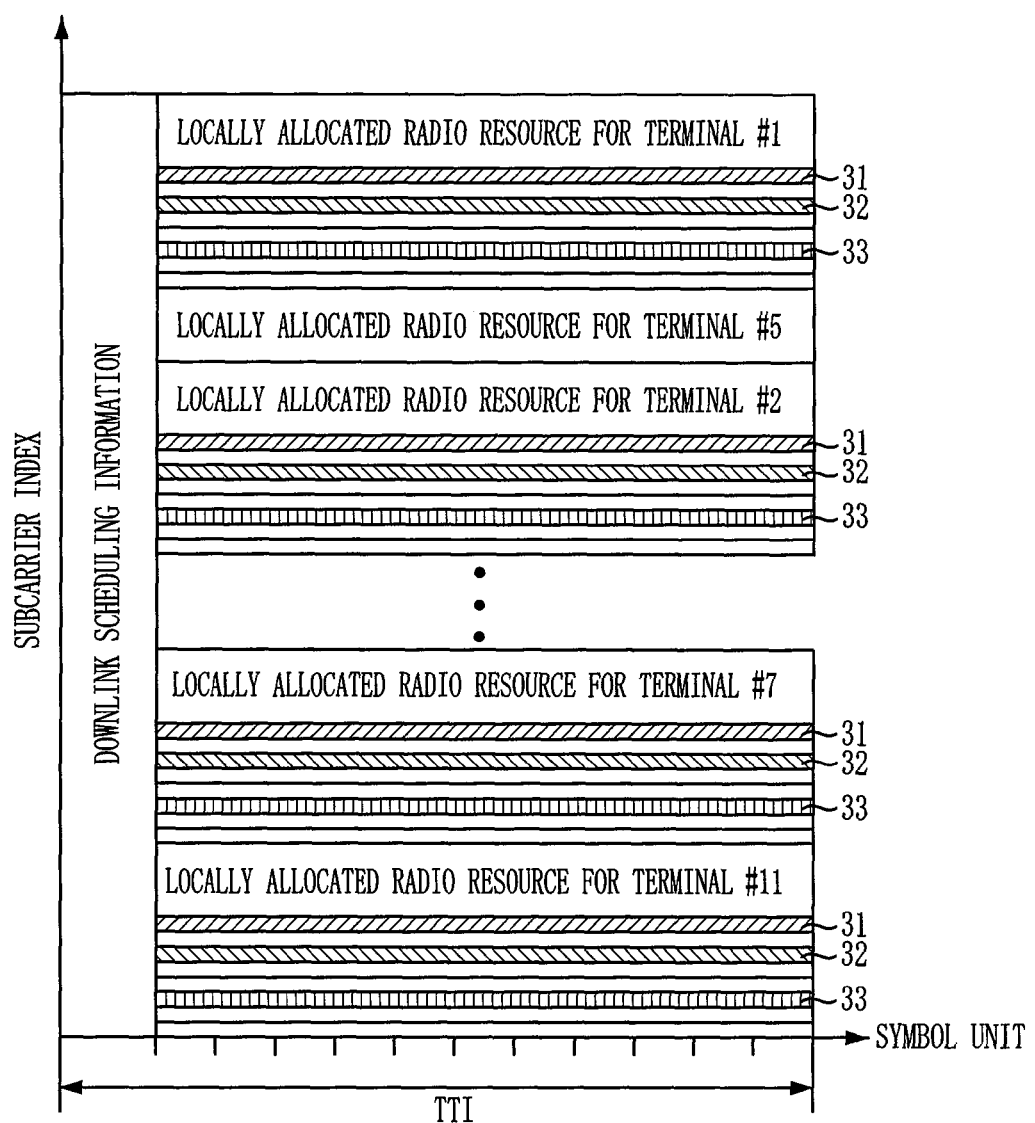
FIG. 4 is a diagram illustrating exclusively allocating and using a distributed allocated radio resource for transmitting downlink control information in accordance with an embodiment of the present invention.

FIG. 4 is a diagram illustrating exclusively allocating and using distributed and allocated radio resources for transmitting downlink control information.

As shown in FIG. 4, downlink radio resources can be reserved, allocated and used for transmitting response information for random access and information for informing downlink data generation. A base station reserves and allocates downlink distributed allocated radio resource block or channel for transmitting control information transmitted to a downlink such as the response information for random access and the information for informing downlink data generation at an assigned location of TTI and broadcasts the allocated information with system information to entire base station through a broadcasting channel (BCH). Since terminals detect a block or a channel among downlink radio resources, which is used to transmit the response information for random access and the information for informing downlink data generation through a broadcasting channel, the terminals do not need additional control information for addressing a downlink radio resource block or channel to transmit the control information of a downlink. If uplink control information to transmit to a downlink is not present in a TTI, a radio resource block or channel which is assigned and reserved to transmit control information using downlink scheduling information can be variably used for transmitting another information.

In FIG. 4, a reference numeral 31 denotes a radio resource distributed and allocated for transmitting grant information, a reference numeral 32 denotes a radio resource distributed and allocated for transmitting downlink data generation indication information, and a reference numeral 33 denotes a radio resource distributed and allocated for transmitting response information for sustaining uplink synchronization of a physical layer.

While the present invention has been described with respect to certain preferred embodiments, it will be apparent to those skilled in the art that various changes and modifications may be made without departing from the spirits and scope of the invention as defined in the following claims.

As described above, the method for transmitting and receiving downlink control information in a packet-based cellular system according to an embodiment present invention can maximize the use of limited radio resource by effectively forming a uplink signaling message to transmit from a base station to a terminal and transmitting the formed uplink signaling message with minimum radio resource occupied.

What is claimed is:

1. A method for performing random access in a terminal of a wireless communication system, the method comprising:
   receiving, when downlink data is generated during discontinuous reception (DRX) in an active state where the terminal has set up a data channel for transmitting/receiving data to/from a base station, downlink data generation indication information indicating an own random access preamble used for the random access from a base station;
   transmitting the random access preamble indicated by the downlink data generation indication information to the base station; and
   receiving a response for the random access from the base station, wherein the response is allocated to downlink-shared radio resource and transmitted from the base station,
   wherein the response for the random access is addressed using an identifier informing transmission of the response for the random access,
   wherein the identifier is reserved and allocated among scheduling identifiers used in the wireless communication system, and received through a channel carrying downlink scheduling information,
   wherein the identifier is determined based on a resource region for random access, the resource region being expressed in a frequency and a time, and wherein the downlink data generation indication information is received through a control message using a unique scheduling identifier for the terminal during Radio Resource Control (RRC) connected state.

2. The method as recited in claim 1, wherein the response for the random access includes one or more among timing adjustment (TA) information, information on allocation of radio resource to be used when uplink transmission is performed, information on power level to be used when uplink transmission is performed, an identifier of the single random access preamble and frequency adjustment (FA) information.

3. A method for supporting random access of a terminal in a base station of a wireless communication system, the method comprising:

transmitting, when downlink data to the terminal during discontinuous reception (DRX) in an active state, where the terminal has set up a data channel for transmitting/receiving data to/from a base station, is generated, downlink data generation indication information indicating an own random access preamble used for the random access to the terminal;

receiving the single random access preamble indicated by the downlink data generation indication information from the terminal; and transmitting a response for the random access to the terminal after receiving the single random access preamble, wherein the response is allocated to downlink-shared radio resource and transmitted to the terminal, wherein the response for the random access is addressed using an identifier informing transmission of the response for the random access, wherein the identifier is reserved and allocated among scheduling identifiers used in the wireless communication system, and transmitted through a channel carrying downlink scheduling information, wherein the identifier is determined based on a resource region for random access, the resource region being expressed in a frequency and a time, and wherein the downlink data generation indication information is transmitted through a control message using a unique scheduling identifier for the terminal during Radio Resource Control (RRC) connected state.

4. The method as recited in claim 3, wherein the response for the random access includes one or more among timing adjustment (TA) information, information on allocation of radio resource to be used when uplink transmission is performed, information on power level to be used when uplink transmission is performed, an identifier of the received single random access preamble and frequency adjustment (FA) information.

\* \* \* \* \*